United States Patent
Blinzer et al.

(10) Patent No.: US 10,467,138 B2
(45) Date of Patent: Nov. 5, 2019

(54) CACHING POLICIES FOR PROCESSING UNITS ON MULTIPLE SOCKETS

(71) Applicant: Advanced Micro Devices, Inc., Sunnyvale, CA (US)

(72) Inventors: Paul Blinzer, Bellevue, WA (US); Ali Ibrahim, Sunnyvale, CA (US); Benjamin T. Sander, Austin, TX (US); Vydhyanathan Kalyanasundharam, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 678 days.

(21) Appl. No.: 14/981,833

(22) Filed: Dec. 28, 2015

(65) Prior Publication Data
US 2017/0185514 A1   Jun. 29, 2017

(51) Int. Cl.
*G06F 12/0888* (2016.01)
*G06F 12/0815* (2016.01)
*G06F 12/0813* (2016.01)
*H04L 29/08* (2006.01)

(52) U.S. Cl.
CPC ...... *G06F 12/0815* (2013.01); *G06F 12/0813* (2013.01); *H04L 67/28* (2013.01); *G06F 12/0888* (2013.01); *G06F 2212/154* (2013.01); *G06F 2212/621* (2013.01)

(58) Field of Classification Search
None
See application file for complete search history.

(56) References Cited

U.S. PATENT DOCUMENTS

| | | | |
|---|---|---|---|
| 2009/0037664 A1* | 2/2009 | Kornegay | G06F 12/0888 711/138 |
| 2014/0006696 A1* | 1/2014 | Ramanujan | G11C 13/0004 711/103 |
| 2014/0181414 A1* | 6/2014 | Eckert | G06F 12/0808 711/135 |

OTHER PUBLICATIONS

Microsoft, NUMA Support (Windows), http://msdn.microsoft.com/en-us/library/windows/desktop/aa363804%28v=vs.85%29.aspx, Accessed Apr. 18, 2016, 4 pages.
NUMA (3), Linux Programmer's Manual, http://man7.org/linux/man-pages/man3/numa.3.html, Accessed Apr. 18, 2016, 15 pages.
NUMA (7), Linux Programmer's Manual, http://man7.org/linux/man-pages/man7/numa.7.html, Accessed Apr. 18, 2016, 7 pages.

* cited by examiner

*Primary Examiner* — Brian R Peugh

(57) ABSTRACT

A processing system includes a first socket, a second socket, and an interface between the first socket and the second socket. A first memory is associated with the first socket and a second memory is associated with the second socket. The processing system also includes a controller for the first memory. The controller is to receive a first request for a first memory transaction with the second memory and perform the first memory transaction along a path that includes the interface and bypasses at least one second cache associated with the second memory.

20 Claims, 6 Drawing Sheets

CACHING POLICIES FOR PROCESSING UNITS ON MULTIPLE SOCKETS

BACKGROUND

Field of the Disclosure

The present disclosure relates generally to processing systems and, more particularly, to caching information in processing systems.

Description of the Related Art

Processing systems such as accelerated processing units (APUs) can include multiple sockets. Each socket implements one or more central processing units (CPUs) and one or more accelerators such as graphics processing units (GPUs), which are collectively referred to as processing units. The sockets are associated with corresponding memories, such as dynamic random access memories (DRAM), High-Bandwidth Memory (HBM), or other memory types, depending on platform configuration. The processing units also include caches for caching data associated with the execution of scheduled tasks. The sockets are interconnected by corresponding bus interfaces. The APUs can support non-uniform memory access (NUMA) so that each processing unit can access memories associated with the same (local) socket or one or more different (remote) sockets. The latency for a processing unit to access the DRAM or HBM associated with a local socket is lower than the latency for the processing unit to access memory associated with remote sockets.

Maintaining cache coherency between caches associated with processing units on different sockets incurs a significant cost in terms of performance or latency due to the large number of cache probes that need to be transmitted over the (relatively low bandwidth) socket interfaces. For example, GPU operations are typically memory intensive and each memory transaction initiated by a GPU requires transmitting corresponding probes over socket interfaces to the other sockets to maintain cache coherency between the sockets. Thus, each memory transaction incurs a latency cost due to the time required for the probe response from other caches. Many operating systems are "NUMA-aware" and are therefore able to avoid most memory transactions that would cross the socket interfaces by storing data for processes running on a GPU in the local memory associated with the GPU's socket. However, some virtual memory resources for the GPU may still be stored in the physical memory associated with a different socket, e.g., if the local memory resources are exhausted, if the memory is used for inter-thread communication, or if the application that initiated the process is not NUMA-aware.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The performance and latency cost of maintaining cache coherency in a NUMA processing system can be reduced by bypassing one or more caches on a first socket during a memory transaction with a first memory associated with the first socket in response to a processing unit on a second socket initiating the memory transaction with the first memory. The first socket is connected to the second socket by a socket interface such as a bus interface between the first and second sockets. Since the caches on the first socket have been bypassed by memory transactions involving the second socket, a local memory controller associated with the second socket "knows" that there is no need to send probes over the socket interface to invalidate cache lines on the first socket, e.g., in response to data being written to a physical memory address in a second memory associated with the second socket. Cache coherency is preserved in the one or more caches on the first socket using probes or snooping that are subsequently performed by the caches on the first socket. Some embodiments of the processing system include one or more external devices connected to the second socket. Memory transaction requests from the external devices such as writes to the first memory invalidate corresponding lines in the caches on the first socket but do not invalidate lines in the caches on the second socket.

In some embodiments, the memory transaction (or corresponding request) includes a virtual memory address that indicates a physical memory address in the first memory or a second memory associated with the second socket. Some embodiments of a memory controller determine whether to bypass the one or more caches on the first socket based on whether the physical memory address is in the first memory or the second memory. For example, if the virtual memory address is mapped to a physical memory address in the second memory, the memory controller attempts to perform the memory transaction using cached information that is copied from the physical memory address in the second memory. However, if the virtual memory address is mapped to a physical memory address in the first memory, the memory controller bypasses the one or more caches on the first socket and performs the memory transaction using information stored at the physical memory address in the first memory.

Figure 1:
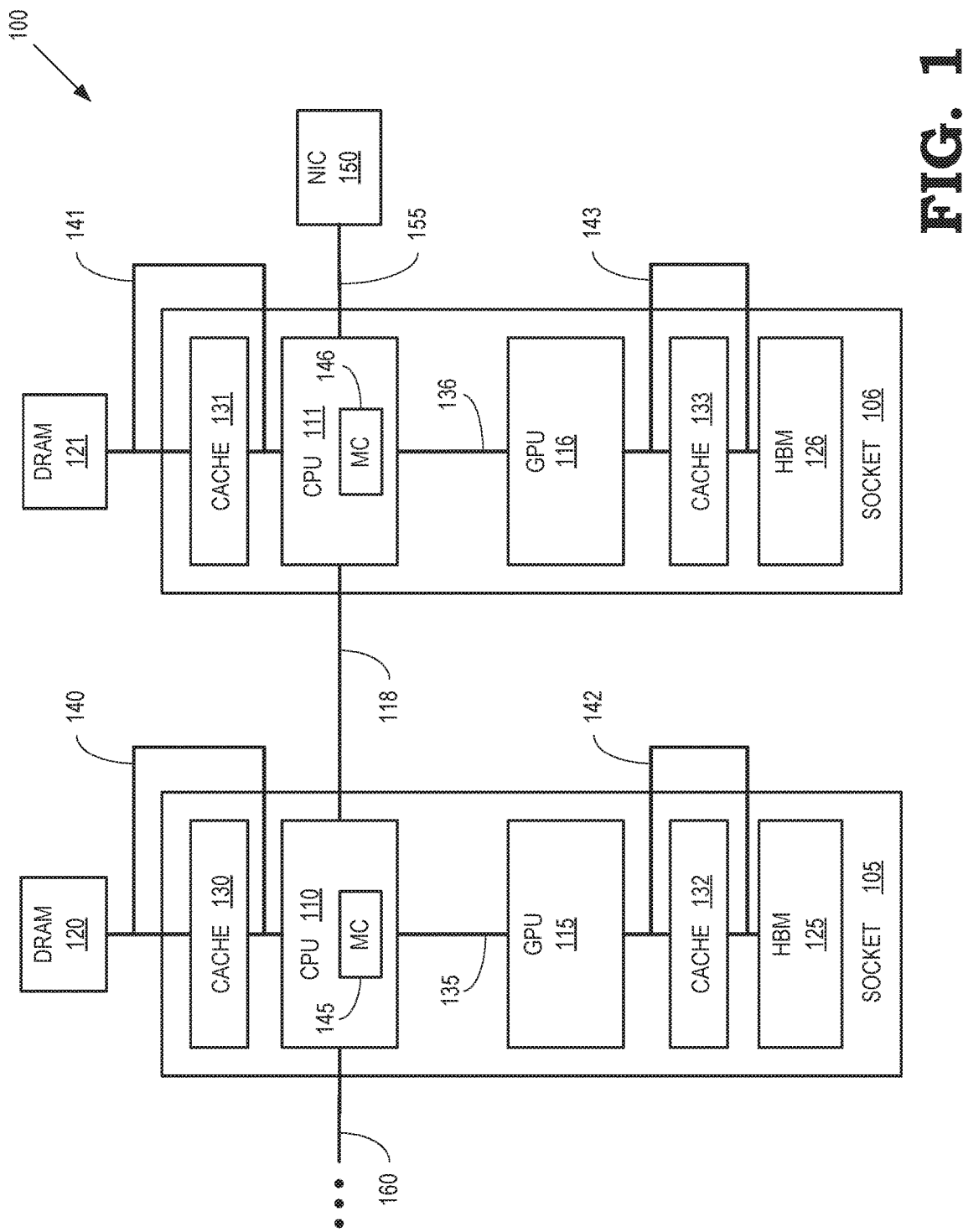
FIG. 1 is a block diagram of a processing system including multiple sockets that are connected by a socket interface according to some embodiments.

FIG. 1 is a block diagram of a processing system 100 including multiple sockets 105, 106 that are connected by a socket interface 118 according to some embodiments. Although the processing system 100 includes two sockets 105, 106, some embodiments of the processing system 100 may include additional sockets (not shown) that are interconnected by additional socket interfaces (not shown). The sockets 105, 106 include corresponding central processing units (CPUs) 110, 111, which include one or more individual processing units such as processor cores that can execute instructions concurrently or in parallel. The sockets 105, 106 also include corresponding graphics processing units (GPUs) 115, 116 that are configured to manipulate and alter stored information to accelerate the creation of images in a frame buffer intended for output to a display. Some embodiments of the socket interface 118 are implemented as a bus interface.

The sockets 105, 106 are associated with corresponding memory elements, which may be internal to (e.g., implemented on) the corresponding sockets 105, 106 or external to the corresponding sockets 105, 106. For example, the sockets 105, 106 are connected to corresponding external dynamic random access memories (DRAMs) 120, 121. For another example, the sockets 105, 106 implement internal high-bandwidth memories (HBMs) 125, 126. Some embodiments of the sockets 105, 106 may be associated with different types of internal or external memory elements.

Caches 130, 131, 132, 133 (collectively referred to herein as "the caches 130-133") are used to store (or cache) copies of information stored in the corresponding memories 120, 121, 125, 126. Memory transactions may then be performed using the cached copy of the information instead of performing the memory transaction directly on the information stored in the corresponding memories 120, 121, 125, 126. The blocks used to represent the caches 130-133 may represent a single cache or a plurality of caches such as a cache hierarchy. For example, the cache 130 may represent a cache hierarchy including multiple cache levels such as an L1 cache, an L2 cache, or an L3 cache. For another example, the cache 130 may include a plurality of caches (or cache hierarchies) that are used to cache information for a corresponding plurality of processing units or processor cores.

Processing units including the CPUs 110, 111 (or individual processing units or processor cores included in the CPUs 110, 111) and the GPUs 115, 116 can access information in any of the memory elements 120, 121, 125, 126 associated with either of the sockets 105, 106. Thus, memory transactions can occur between the processing units and associated memories of one of the sockets 105, 106 or between the processing units and associated memories of different sockets. For example, the GPU 115 in the socket 105 can generate a memory access request for a memory transaction such as a read or a write of a location in the DRAM 120 that is associated with the same socket 105. The memory access request or memory transaction can be conveyed over an interface 135. The bandwidth of the interface 135 may be higher than the bandwidth of the interface 118. An interface 136 is used to convey memory access requests or memory transactions in the socket 106 and may also have a bandwidth that is higher than the bandwidth of the interface 118. For another example, the GPU 116 in the socket 106 can generate a memory access request for a memory transaction involving a location in the DRAM 120 that is associated with a different socket 105. In this case, the memory access request or memory transaction is conveyed over the socket interface 118.

Memory controllers 145, 146 are used to manage the flow of data to and from the memory elements 120, 121, 125, 126 associated with the corresponding sockets 105, 106. In some embodiments, the memory controllers 145, 146 are implemented in the corresponding CPUs 110, 111. However, the memory controllers 145, 146 may also be implemented at other locations on the sockets 105, 106. The memory controllers 145, 146 operate according to caching policies and cache coherence policies that govern caching of data in the caches 130-133, eviction of data from the caches 130-133, and the like. The memory controllers 145, 146 may selectively bypass the caches 130-133 associated with the memory elements 120, 121, 125, 126 based on the source of the memory access request, as discussed herein.

Some embodiments of the sockets 105, 106 include paths 140, 141, 142, 143 (collectively referred to herein as "the paths 140-143") that bypass the corresponding caches 130-133. The memory controllers 145, 146 may therefore selectively transmit memory access requests or perform memory transactions using the paths 140-143 depending upon whether the request from a processing unit on a socket involves a memory location in a memory element on the same socket or a different socket. For example, in response to a request from the GPU 115 for information located in the DRAM 120, the memory controller 145 may attempt to find the requested information in the cache 130. For another example, in response to a request from the GPU 116 (on the socket 106) for information located in the DRAM 120 (associated with the socket 105), the memory controller 146 may bypass the cache 130 using the path 140 to directly access the DRAM 120. For yet another example, in response to a request from the GPU 116 (on the socket 106) for information located in the HBM 125 (associated with the socket 105), the memory controller 146 may bypass the cache 132 using the path 142 to directly access the HBM 125.

Cache probes are used to invalidate cache lines in the caches 130-133 in response to memory transactions involving locations in the memory elements 120, 121, 125, 126 that include copies of the data in the invalidated cache lines. Cache probes may be selectively transmitted to the caches 130-133 depending upon whether the memory transaction involves a memory location in a memory element on the same socket as the requesting processing unit or a different socket. For example, if memory controller 146 implements a caching policy that bypasses the cache 130 for memory access requests or memory transactions from the GPU 116 to the DRAM 120, as discussed herein, the memory controller 146 is aware that the cache 130 does not include any cache lines associated with memory access requests from the GPU 116. The memory controller 146 may therefore bypass transmitting cache probes to invalidate cache lines in the cache 130 in response to memory access requests or memory transactions between the GPU 116 and the DRAM 121 or the HBM 126. Similarly, the memory controller 146 may bypass transmitting cache probes to invalidate cache lines in the cache 132.

Some embodiments of the processing system 100 include direct memory access (DMA) capable devices. For example, the processing system 100 includes a network interface card 150 that is connected to the socket 106 over an interface 155, such as a peripheral component interface (PCI) bus. The network interface card 150 can initiate memory transactions with the memories 120, 121, 125, 126 associated with the sockets 105, 106. Memory access requests or memory transactions involving a DMA device such as the network interface card 150 can selectively bypass the caches 130-133 using the corresponding paths 140-143. Thus, the memory controllers 145, 146 can selectively bypass transmission of cache probes over the socket interface 118. For example, a write transaction from the network interface card 150 to the DRAM 120 or the HBM 125 may bypass the caches 131, 133 on the socket 106. The write transaction may therefore trigger transmission of cache probes to invalidate corresponding cache lines in one or more of the caches 130, 132 on the socket 105. However, the write transaction does not trigger transmission of cache probes to invalidate corresponding cache lines in the caches 131, 133 on the socket 105 because the memory controller 145 "knows" that write transactions from the network interface card 150 to memory elements 120, 125 associated with the socket 105 do not modify cache lines in the caches 131, 133.

The memory controllers 145, 146 may implement different caching policies or cache coherence policies for the different processing elements 110, 111, 115, 116. For example, the CPUs 110, 111 may implement caching policies and cache coherence policies that utilize the caches 130-133 on both sockets 105, 106 regardless of source, whereas the GPUs 115, 116 may implement caching policies and cache coherence policies to limit caching to local caches (i.e., caches on the same socket as the GPU) and bypassing caches on remote caches (i.e., caches on a different socket than the GPU). Implementing caching policies and cache coherence policies that bypass remote caches may be particularly beneficial to GPUs 115, 116, which typically perform memory-intensive operations that generate a lot of memory traffic, most if not all of which goes to the local memory associated with the local socket that includes the GPU performing the memory transaction. However, as discussed herein, a subset of the virtual addresses used by the GPU may be mapped to remote memory elements associated with a remote socket that is connected to the local socket by the socket interface 118. If data for memory transactions between the GPU on the local socket and the memory on the remote socket is cached on the remote socket, maintaining cache coherency would require that every write to an address in the memory on the local socket generates a probe of the remote cache. All of these probes would have to travel over the socket interface 118. Since the local GPU generates so many requests to the local memory, the large number of probes would have a serious impact on the performance or latency of the processing system 100. The memory controllers 145, 146 may therefore implement caching policies for the GPUs 115, 116 that bypass the remote cache to ensure that none of the lines in the remote cache include information requested by the GPU from the remote memory. Thus, the memory controllers 145, 146 "know" that there is no need to send probes to invalidate cache lines in the remote cache in response to the GPU writing information to the local cache or corresponding memory. Because of the high volume of memory traffic to the local memory (compared to memory traffic to the remote memory), the performance or latency gains from avoiding sending cache probes over the socket interface 118 exceeds any performance losses incurred by not caching information in the remote cache.

Some embodiments of the memory controllers 145, 146 may also implement different caching policies or cache coherence policies for different applications. For example, the memory controllers 145, 146 may implement caching policies or cache coherence policies for memory-intensive applications executing on the CPUs 110, 111 that selectively bypass the caches 130-133 for memory access requests or memory transactions that require transmitting information over the socket interface 118. Thus, the number of cache probes transmitted over the socket interface 118 may be reduced for the memory-intensive applications. For another example, the memory controllers 145, 146 may implement caching policies or cache coherence policies for compute-bounded applications that do not bypass the caches 130-133 for memory access requests or memory transactions that involve the socket interface 118 because the potential gains of bypassing transmission of cache probes over the socket interface 118 may not outweigh the performance losses incurred by not caching information for all memory access requests or memory transactions.

Although the processing system 100 shown in FIG. 1 depicts two adjacent sockets 105, 106 that are directly connected by the socket interface 118, some embodiments of the processing system 100 include other sockets connected to the socket 105 by a socket interface 160 and possibly one or more additional socket interfaces, depending on the total number of sockets in the processing system 100. The caching policies disclosed herein may therefore be applied based on whether the memory access is to memory associated with the local socket, i.e., the memory access is performed by a processing unit on a socket associated with the accessed memory, or the memory access is to a memory associated with a remote socket, i.e., the accessed memory is associated with a different socket than the socket that includes the accessing processing unit. For example, the CPU 111 on the (local) socket 106 may initiate a memory access to a DRAM or an HBM associated with a remote socket (not shown) that is connected to the processing system 100 via the socket interface 160 (and potentially one or more other socket interfaces that are not shown in FIG. 1). The caches 130, 132 on the (remote) socket 105, one or more caches on the remote socket associated with the accessed DRAM or HBM, and any caches on any intervening remote sockets may therefore be bypassed in response to the memory access initiated by the CPU 111, as discussed herein.

The cache policy that is applied to memory access requests to memories associated with local sockets or remote sockets may be programmatically controlled by defining different memory address ranges for the memories associated with the different sockets 105, 106. Some embodiments of the memory controllers 145, 146 determine whether the memory access requests are to a local socket or a remote socket based on whether the memory address for the request is in a memory address range for memories associated with the local socket or the remote socket. The memory controllers 145, 146 may then determine whether to send probes to memories on the local socket or issue non-cacheable transactions to one or more remote sockets in accordance with the cache policy. The memory address ranges may be defined in terms of physical memory addresses or virtual memory addresses.

Figure 2:
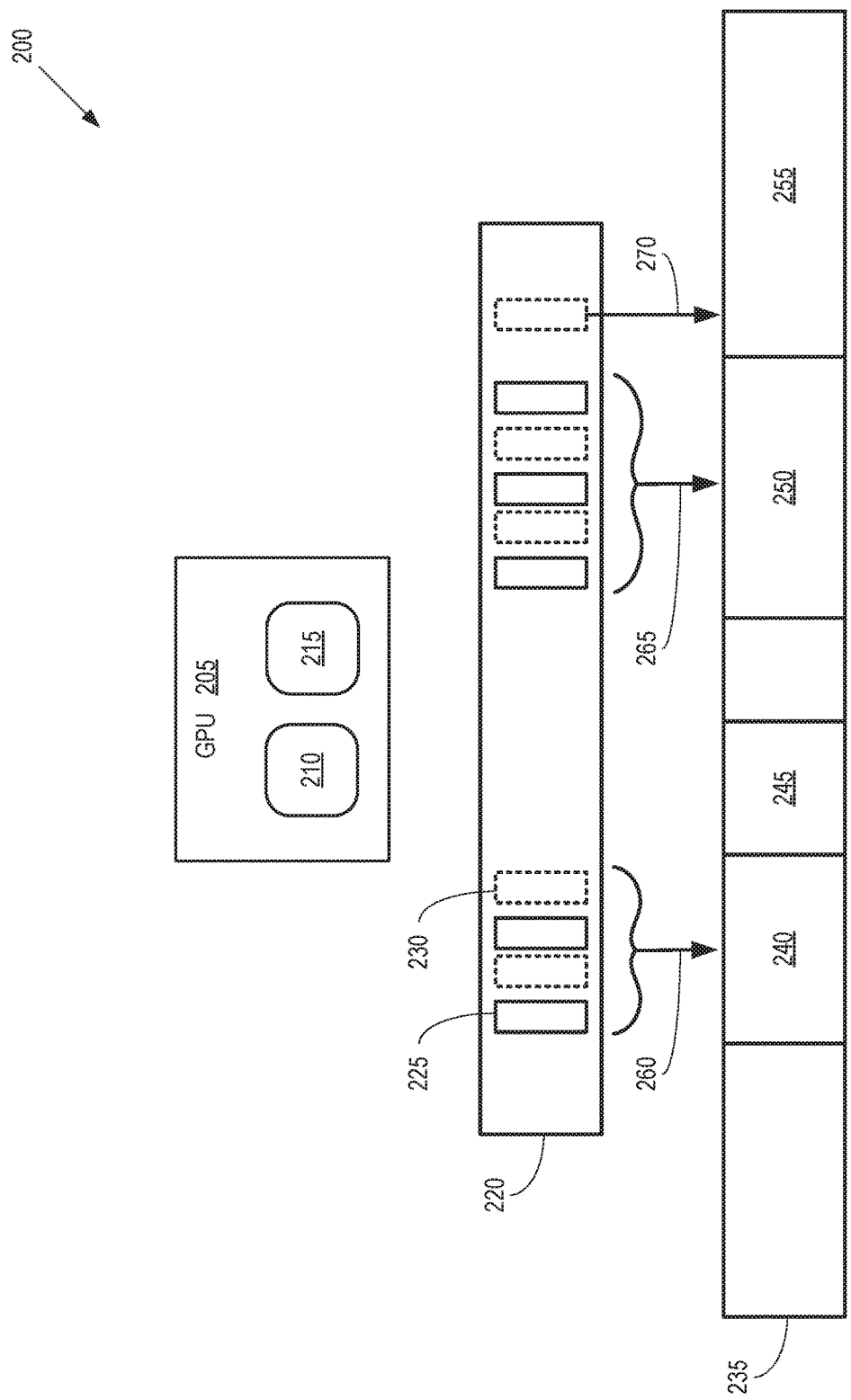
FIG. 2 is a block diagram illustrating a mapping of virtual memory locations to physical memory locations in memory elements of a processing system according to some embodiments.

FIG. 2 is a block diagram illustrating a mapping 200 of virtual memory locations to physical memory locations in memory elements of a processing system according to some embodiments. Some embodiments of the mapping 200 may be used to identify physical memory addresses of locations in the memory elements 120, 121, 125, 126 shown in FIG. 1. The processing system includes two sockets such as the sockets 105, 106 shown in FIG. 1. A GPU 205 on the first socket is executing two processes 210, 215, which may be associated with the same application or different applications. The memory locations utilized by the processes 210, 215 are mapped to virtual memory addresses in a set 220 of virtual memory locations. For example, virtual memory locations 225 (indicated by a solid line block) are allocated to the process 210 and virtual memory locations 230 (indicated by a dotted line block) are allocated to the process 215.

The virtual memory locations in the set 220 are mapped to locations in a physical memory 235. Some embodiments of the physical memory 235 include an HBM 240 on the first socket and an HBM 245 on the second socket, such as the HBM 125 on the socket 105 and the HBM 126 on the socket 106 shown in FIG. 1. Some embodiments of the physical memory 235 also include DRAM 250 associated with the first socket and DRAM 255 associated with the second socket, such as the DRAM 120 associated with the socket 105 and DRAM 121 associated with the socket 106 shown in FIG. 1. A first group of the virtual memory locations allocated to the processes 210, 215 are mapped to the HBM 240 associated with the first socket, as indicated by the arrow 260. A second group of the virtual memory locations are mapped to the DRAM 250 associated with the first socket, as indicated by the arrow 265. A third group of the virtual memory locations are mapped to the DRAM 255 associated with the second socket, as indicated by the arrow 270.

Memory controllers in the processing system, such as the memory controllers 145, 146 shown in FIG. 1 may use the virtual-to-physical address mappings 260, 265, 270 to determine which cache policies or cache coherence policies to apply to memory access requests or memory transactions involving the virtual memory locations 225, 230 allocated to the processes 210, 215. For example, if a memory access request includes a virtual memory address that maps to the HBM 240 on the first socket (as indicated by the arrow 260), the memory controller may attempt to access a cache line indicated by the virtual memory address. The memory controller may also transmit cache probes to invalidate corresponding cache lines in other caches on the first socket. For another example, if the memory access request includes a virtual memory address that maps to the DRAM 255 on the second socket (as indicated by the arrow 270), the memory controller may bypass caches on the second socket and directly access the physical location in the DRAM 255 indicated by the physical memory address indicated by the virtual memory address in the memory access transition. The memory controller may also bypass transmitting cache probes to the caches on the second socket in response to other memory access requests.

Figure 3:
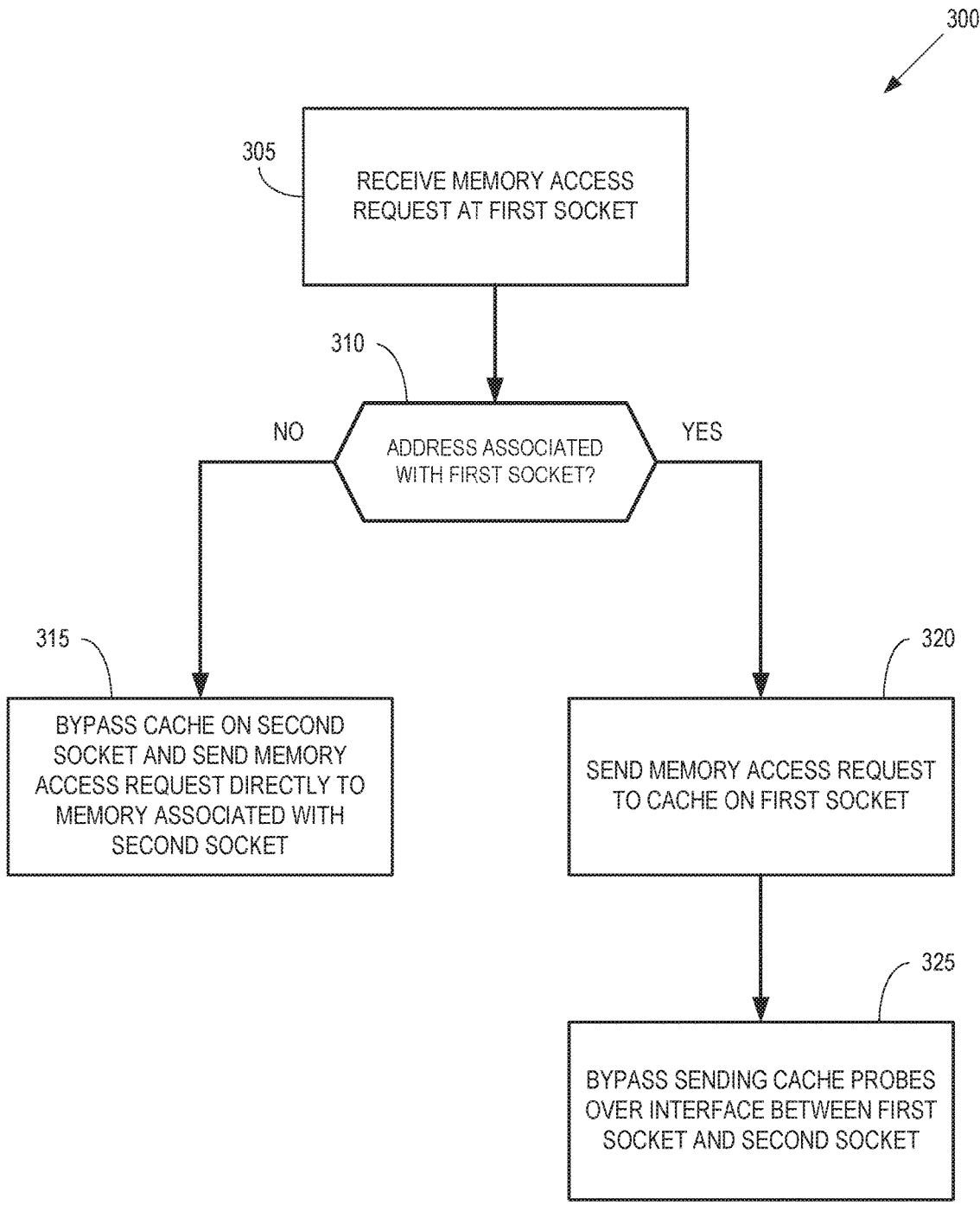
FIG. 3 is a flow diagram of a method for selectively bypassing caches or transmission of cache probes according to some embodiments.

FIG. 3 is a flow diagram of a method 300 for selectively bypassing caches or transmission of cache probes according to some embodiments. The method 300 may be implemented in some embodiments of memory controllers such as the memory controllers 145, 146 shown in FIG. 1. At block 305, a memory access request is received at a first socket. The memory access request may be generated by an entity implemented on the first socket, such as a CPU or GPU, or the memory access request may be received from another entity such as a network interface card. The memory access request includes information indicating an address in a memory such as a virtual memory address or a physical memory address. Virtual memory addresses can be translated or mapped to corresponding physical memory addresses, as discussed herein.

At decision block 310, the memory controller determines whether the address indicates a location in a memory element associated with the first socket or a memory element associated with a second socket that is connected to the first socket by a socket interface. For example, the memory controller may translate the virtual memory address to a physical memory address that indicates a location in a memory element associated with the first or second socket. The memory controller can then use the physical memory address to determine whether the location is in a memory element associated with the first or second socket. If the address indicates a location in a memory element associated with the second socket, the method 300 flows to block 315. At block 315, the memory controller bypasses the one or more caches associated with the memory element and sends the memory access requests directly to the memory element associated with the second socket.

The method 300 flows to block 320 if the address indicates a location in a memory element associated with the first socket. At block 320, the memory controller sends the memory access request to a cache (or cache hierarchy) associated with the memory element. For example, the memory controller may use the virtual address or physical address to determine whether a copy of the location is cached in one or more of the caches associated with the memory element. If so, the memory transaction may be performed using the cached information. The memory controller also "knows" that memory access requests or memory transactions by the GPU bypass the caches on the second socket and, consequently, there is no need to send cache probes to invalidate cache lines in the caches on the second socket in response to memory transactions or memory access requests initiated by the GPU. The memory controller therefore bypasses (at block 325) sending cache probes over the socket interface between the first socket and the second socket.

Figure 4:
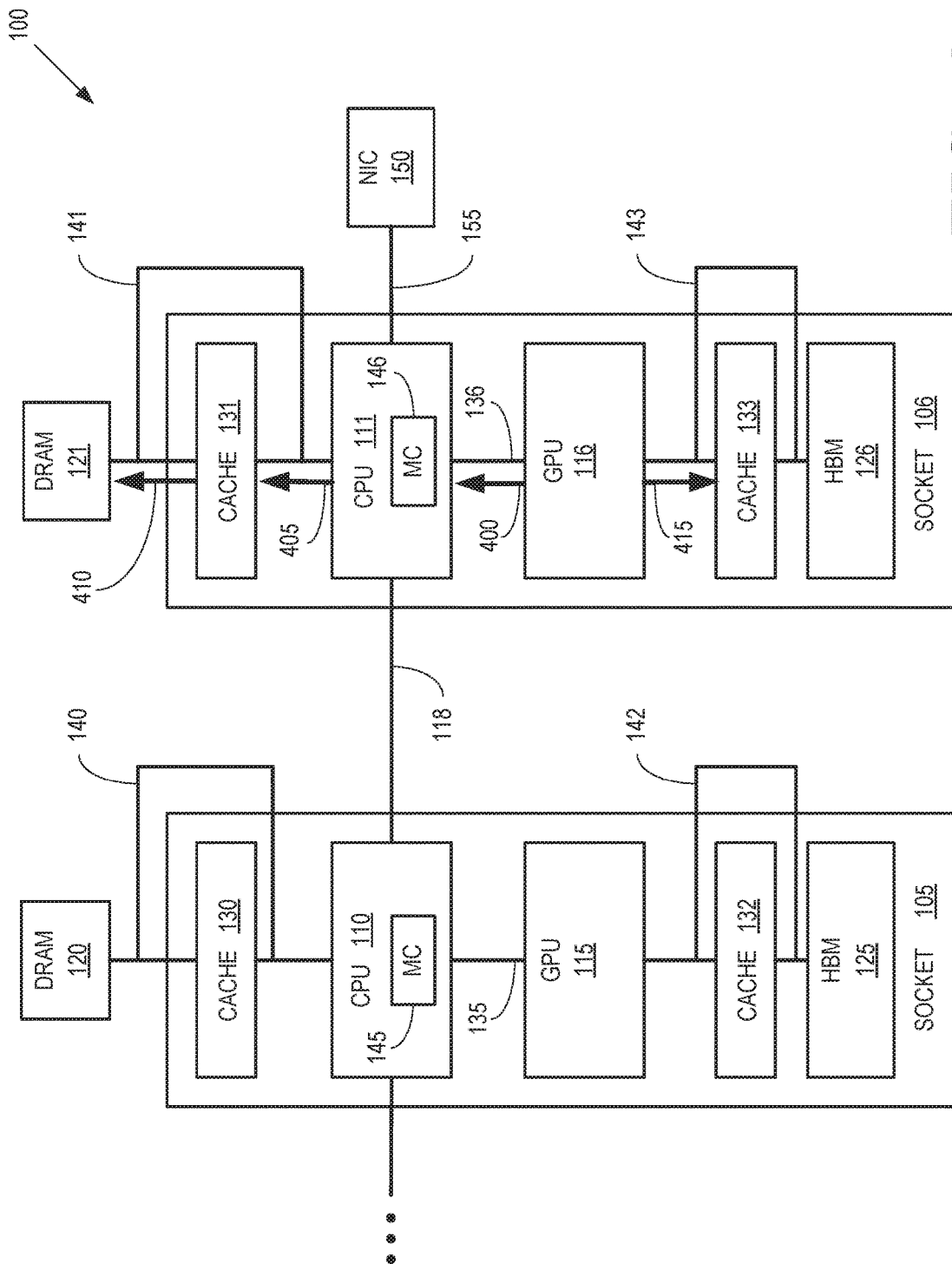
FIG. 4 is a block diagram illustrating information flow used to preserve cache coherency in the processing system shown in FIG. 1 in response to writing information to a local memory according to some embodiments.

FIG. 4 is a block diagram illustrating information flow used to preserve cache coherency in the processing system 100 shown in FIG. 1 in response to writing information to a local memory according to some embodiments. The GPU 116 on the socket 106 issues a write request to write information to a location in the local DRAM 121. The write request is conveyed to the memory controller 146, as indicated by the arrow 400. The memory controller 146 determines that the write request is addressed to a location in the local DRAM 121 and consequently the memory controller 146 directs the request to the cache 131, as indicated by the arrow 405. If the data stored at the requested location in the DRAM 121 has been cached in the cache 131 (a cache "hit"), the information is written to the cache line in the cache 131. A write back may be subsequently used to refresh the data stored at the requested location in the DRAM 121 using the modified data that was written to the cache line in the cache 131. If the data stored at the requested location in the DRAM 121 has not been cached in the cache 131 (a cache "miss"), the write request is directed to the DRAM 121 so that the information can be written directly to the location in the DRAM 121, as indicated by the arrow 410.

Cache coherency is maintained within the local socket 106 by transmitting a cache probe to invalidate any cache lines corresponding to the location in the DRAM 121 addressed by the write request, as indicated by the arrow 415. However, the memory controller 146 bypasses transmitting cache probes over the socket interface 118 to invalidate cache lines corresponding to the location in the DRAM 121 addressed by the write request. As discussed herein, the memory controller 146 implements a caching policy for the GPU 116 that bypasses the remote caches 130, 132 to ensure that none of the lines in the remote caches 130, 132 include information requested by the GPU 116 from the remote memories 120, 125. Thus, the memory controller 146 "knows" that there is no need to send probes to invalidate cache lines in the remote caches 130, 132 in response to the GPU 116 writing information to the local cache 131 or corresponding DRAM 121.

Figure 5:
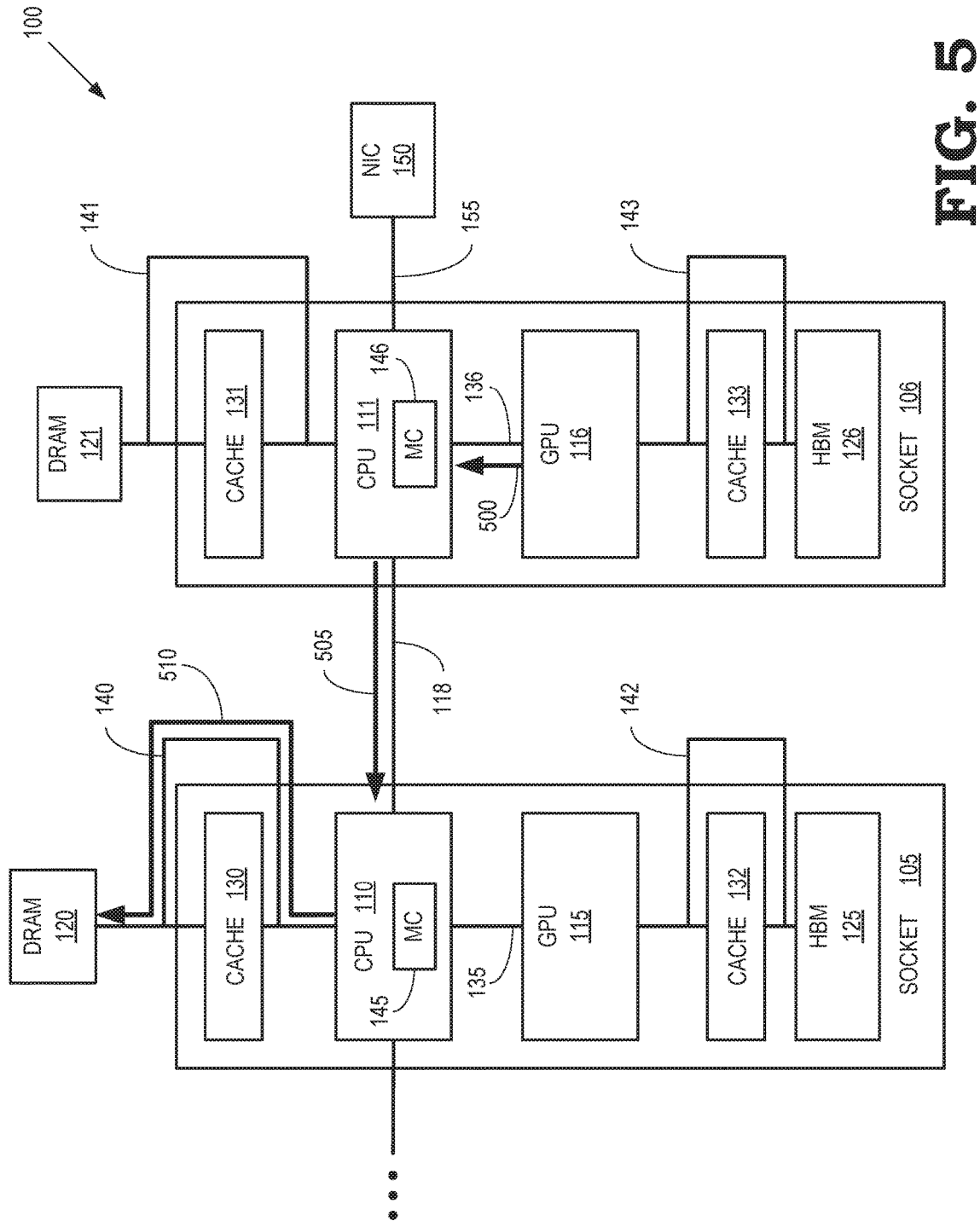
FIG. 5 is a block diagram illustrating information flow used to bypass remotes caches in the processing system shown in FIG. 1 in response to writing information to a remote memory according to some embodiments.

FIG. 5 is a block diagram illustrating information flow used to bypass remote caches in the processing system 100 shown in FIG. 1 in response to writing information to a remote memory according to some embodiments. The GPU 116 on the socket 106 issues a write request to write information to a location in the remote DRAM 120. The write request is conveyed to the memory controller 146, as indicated by the arrow 500. The memory controller 146 determines that the write request is addressed to a location in the remote DRAM 120 and the memory controller 146 directs the request over the socket interface 118, as indicated by the arrow 505. To ensure that cache probes do not need to be sent over the socket interface 118, the memory controller 146 sends the request directly to the DRAM 120 and bypasses the cache 130, as indicated by the arrow 510. The information in the write request is written directly to the location in the DRAM 120 and none of the cache lines in the caches 130, 132 on the socket 105 are modified. The memory controller 145 in the socket 105 may subsequently transmit cache probes to invalidate lines in the caches 130, 132 to maintain cache coherency within the socket 105.

Figure 6:
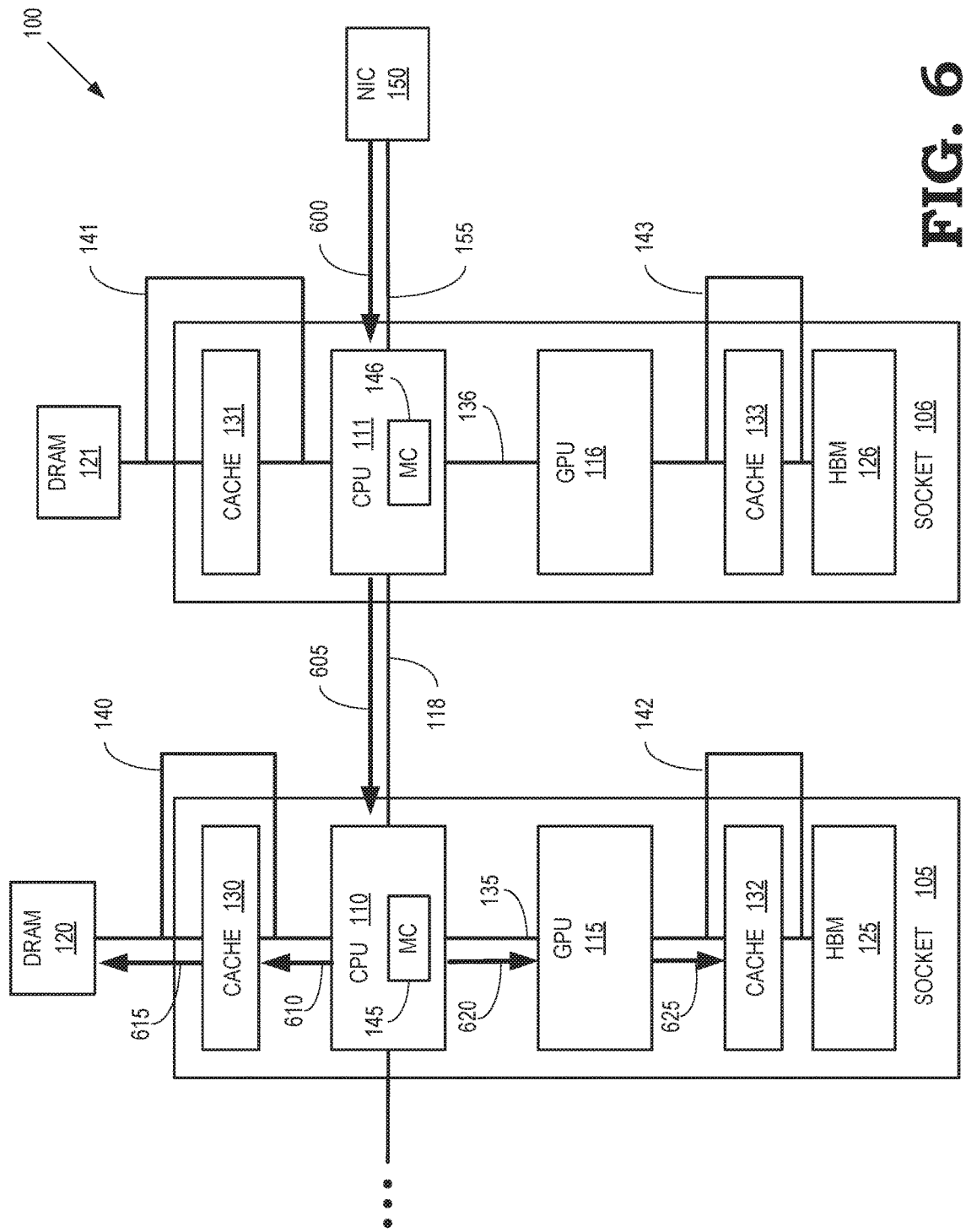
FIG. 6 is a block diagram illustrating information flow used to bypass remotes caches in the processing system shown in FIG. 1 in response to a network interface card writing information to a local memory according to some embodiments.

FIG. 6 is a block diagram illustrating information flow used to bypass remotes caches in the processing system 100 shown in FIG. 1 in response to a network interface card writing information to a local memory according to some embodiments. The network interface card 150 issues a write request to write information to a location in the DRAM 120. The write request is conveyed to the memory controller 146, as indicated by the arrow 600. The memory controller 146 determines that the write request is addressed to a location in the DRAM 120 and the memory controller 146 directs the request over the socket interface 118, as indicated by the arrow 605. The memory controller 146 bypasses transmitting the write request to either of the caches 131 or 133 on the socket 106. The write request is then transmitted to the cache 130, as indicated by the arrow 610. If the write request hits in the cache 130, the information is written to the cache line in the cache 130. A write back may be subsequently used to refresh the data stored at the requested location in the DRAM 120 using the modified data that was written to the cache line in the cache 131. If the write request misses in the cache 130, the write request is directed to the DRAM 120 so that the information can be written directly to the location in the DRAM 120, as indicated by the arrow 615.

Cache coherency is maintained within the socket 105 by transmitting a cache probe to invalidate any cache lines corresponding to the location in the DRAM 120 addressed by the write request, as indicated by the arrows 620, 625. However, the memory controller 145 bypasses transmitting cache probes over the socket interface 118 to invalidate cache lines in the caches 131, 133 corresponding to the location in the DRAM 120 addressed by the write request. As discussed herein, the memory controllers 145, 146 implement a caching policy that bypasses the caches 131, 133 for write requests from the network interface controller 150 to ensure that none of the lines in the caches 131, 133 include information requested by the network interface card 150 from the memories 120, 125. Thus, the memory controller 145 "knows" that there is no need to send probes to invalidate cache lines in the caches 131, 133 in response to the network interface card 150 writing information to the cache 130 or corresponding DRAM 120.

In some embodiments, memory allocated to the GPUs 115, 116 is configured as virtual memory. The virtual memory addresses in memory access requests are therefore translated to physical memory addresses indicating locations in the memory elements 120, 121, 125, 126 to determine the physical locations indicated in the memory access requests. Cache policies that selectively bypass caches on one of the sockets 105, 106 in response to memory access requests initiated by entities on another one of the sockets 105, 106 (or the network interface card 150) may also be used to configure drivers to indicate the remote pages associated with virtual memory accesses that are to remain un-cached, e.g., by bypassing the relevant caches as discussed herein. For example, a virtual memory page table may be configured to include attributes indicating whether caches are to be selectively bypassed in response to memory access requests to particular pages referenced by virtual memory addresses.

Some embodiments of the virtual memory page table include a page attribute bit that can trigger a monitor interrupt. The page attribute bit can be set for a (virtual or physical) address range so that a GPU on a remote socket can issue a monitor interrupt that is transmitted over the socket interface 118 to update one or more of the caches on a different socket. The address range may be indicated in a translation lookaside buffer. The monitor interrupt may be triggered when a write request accesses an address in the address range indicated in the translation lookaside buffer. The monitor interrupt may be used to trigger software invalidation of one or more remote cache lines or collision recovery in cases where a physical access to a remote cache is transmitted over the socket interface 118 between the sockets 105, 106.

In some embodiments, the apparatus and techniques described above are implemented in a system comprising one or more integrated circuit (IC) devices (also referred to as integrated circuit packages or microchips), such as the processing system described above with reference to FIGS. 1-6. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc , magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving, at a first controller for a first memory directly associated with a first socket, a first request for a first memory transaction with a second memory, distinct from the first memory, directly associated with a second socket, distinct from the first socket, connected to the first socket by an interface; and
   performing the first memory transaction along a path that includes the interface and bypasses at least one second cache directly associated with the second memory.

2. The method of claim 1, wherein the first socket includes at least one first central processing unit (CPU) and at least one first graphics processing unit (GPU), and wherein the second socket includes at least one second CPU and at least one second GPU, and wherein receiving the first request for the first memory transaction comprises receiving the first request for the first memory transaction from the at least one first GPU.

3. The method of claim 1, wherein receiving the first request for the first memory transaction comprises receiving the first request for the first memory transaction from a network interface card connected to the first socket.

4. The method of claim 1, further comprising:
   invalidating at least one cache line in at least one first cache directly associated with the first socket in response to the first request for the first memory transaction and based on the path selected for the first request.

5. The method of claim 4, wherein cache lines in at least one second cache directly associated with the second socket are not invalidated by cache probes transmitted over the interface in response to the first request for the first memory transaction with the second memory.

6. The method of claim 5, wherein a second controller directly associated with the second socket transmits at least one cache probe to invalidate cache lines in at least one second cache directly associated with the second socket and bypasses transmitting cache probes over the interface.

7. The method of claim 6, further comprising:
   receiving, at the first controller, a second request for a second memory transaction with the first memory; and
   bypassing transmission of a cache probe over the interface to the at least one second cache in response to receiving the second request.

8. The method of claim 7, further comprising:
   invalidating at least one line in at least one first cache directly associated with the first memory based on a virtual address directly associated with the second memory transaction.

9. An apparatus comprising:
   a first socket and a second socket distinct from the first socket;
   an interface between the first socket and the second socket;
   a first memory directly associated with the first socket and a second memory distinct from the first memory and directly associated with the second socket; and
   a first controller for the first memory, wherein the first controller is to receive a first request for a first memory transaction with the second memory and perform the first memory transaction along a path that includes the interface and bypasses at least one second cache directly associated with the second memory.

10. The apparatus of claim 9, further comprising:
    at least one first central processing unit (CPU) and at least one first graphics processing unit (GPU) implemented on the first socket; and
    at least one second CPU and at least one second GPU implemented on the second socket, wherein the first controller is to receive the first request for the first memory transaction from the at least one first GPU.

11. The apparatus of claim 9, further comprising:
    a network interface card connected to the first socket, and wherein the first controller is to receive the first request for the first memory transaction from the network interface card.

12. The apparatus of claim 9, further comprising:
    at least one first cache directly associated with the first socket, and wherein the first controller is to invalidate at least one cache line in the at least one first cache in response to the first request for the first memory transaction.

13. The apparatus of claim 12, further comprising:
    at least one second cache directly associated with the second socket, wherein cache lines in the at least one second cache are not invalidated by cache probes transmitted over the interface in response to the first request for the first memory transaction with the second memory.

14. The apparatus of claim 13, further comprising:
a second controller directly associated with the second socket, wherein the second controller transmits at least one cache probe to invalidate cache lines in at least one second cache directly associated with the second socket and bypasses transmitting cache probes over the interface.

15. The apparatus of claim 14, wherein the first controller is to receive a second request for a second memory transaction with the first memory and bypass transmission of a cache probe over the interface to the at least one second cache in response to receiving the second request.

16. The apparatus of claim 15, where the first controller is to invalidate at least one line in at least one first cache directly associated with the first memory based on a virtual address directly associated with the second memory transaction.

17. A non-transitory computer readable storage medium embodying a set of executable instructions, the set of executable instructions to manipulate a computer system to perform a portion of a process to fabricate at least part of a processing system, the processing system comprising:
a first socket and a second socket distinct from the first socket;
an interface between the first socket and the second socket;
a first memory directly associated with the first socket and a second memory distinct from the first memory and directly associated with the second socket; and
a first controller for the first memory, wherein the first controller is to receive a first request for a first memory transaction with the second memory and perform the first memory transaction along a path that includes the interface and bypasses at least one second cache directly associated with the second memory.

18. The non-transitory computer readable storage medium of claim 17, wherein the processing system further comprises:
a network interface card connected to the first socket, and wherein the first controller is to receive the first request for the first memory transaction from the network interface card.

19. The non-transitory computer readable storage medium of claim 17, wherein the processing system further comprises:
at least one first cache directly associated with the first socket, and wherein the first controller is to invalidate at least one cache line in the at least one first cache in response to the first request for the first memory transaction; and
at least one second cache directly associated with the second socket, wherein cache lines in the at least one second cache are not invalidated by cache probes transmitted over the interface in response to the first request for the first memory transaction with the second memory.

20. The non-transitory computer readable storage medium of claim 19, wherein the processing system further comprises:
a second controller directly associated with the second socket, wherein the second controller transmits at least one cache probe to invalidate cache lines in at least one second cache directly associated with the second socket and bypasses transmitting cache probes over the interface.

* * * * *